(12) United States Patent
Shahmurad et al.

(10) Patent No.: US 9,479,971 B2
(45) Date of Patent: Oct. 25, 2016

(54) CONTROLLING VOCODER SELECTION AT A WIRELESS DEVICE

(71) Applicant: General Motors LLC, Detroit, MI (US)

(72) Inventors: Bassam S. Shahmurad, Clinton Township, MI (US); Mohammad Ishfaq, Northville, MI (US)

(73) Assignee: General Motors LLC, Detroit, MI (US)

(*) Notice: Subject to any disclaimer, the term of this patent is extended or adjusted under 35 U.S.C. 154(b) by 0 days.

(21) Appl. No.: 14/508,568

(22) Filed: Oct. 7, 2014

(65) Prior Publication Data

US 2016/0100335 A1 Apr. 7, 2016

(51) Int. Cl.
G10L 19/12 (2013.01)
H04W 36/00 (2009.01)
H04L 29/06 (2006.01)
H04W 88/06 (2009.01)
H04W 88/18 (2009.01)

(52) U.S. Cl.
CPC ...... *H04W 36/0011* (2013.01); *H04L 65/1046* (2013.01); *H04W 88/06* (2013.01); *H04W 88/181* (2013.01)

(58) Field of Classification Search
CPC ......... H04W 36/0011; H04W 88/181; H04W 88/06; H04L 65/1046
USPC ............. 455/63.3, 560, 552.1, 701; 370/331, 370/370, 329; 704/219, 500, 221, 201, 218, 704/E19.041, E19, 44; 379/31, 93.26, 386, 379/399, 0.02
See application file for complete search history.

(56) References Cited

U.S. PATENT DOCUMENTS

| 6,718,183 B1* | 4/2004 | Blust | G10L 19/005 341/50 |
| 2008/0219244 A1* | 9/2008 | Malhotra | H04M 7/0072 370/352 |
| 2008/0291874 A1* | 11/2008 | Bae | H04W 36/0022 370/331 |
| 2013/0100887 A1* | 4/2013 | Kim | H04W 76/026 370/328 |

* cited by examiner

*Primary Examiner* — Kamran Afshar
*Assistant Examiner* — Farid Seyedvosoghi
(74) *Attorney, Agent, or Firm* — Christopher DeVries; Reising Ethington P.C.

(57) ABSTRACT

A method of controlling a vocoder selection of a wireless device that uses cellular protocols includes wirelessly receiving an instruction at the wireless device from a wireless carrier system, wherein the instruction includes a vocoder identity that is associated with a particular cellular protocol; identifying a vocoder currently in use at the wireless device; and changing the vocoder currently in use at the wireless device if the identified vocoder is different than the vocoder identity included in the instruction.

6 Claims, 2 Drawing Sheets

CONTROLLING VOCODER SELECTION AT A WIRELESS DEVICE

TECHNICAL FIELD

The present invention relates to wireless communications and more particularly to voice calls made via wireless carrier systems.

BACKGROUND

Wireless communications using cellular protocols or techniques have become an increasingly common system for placing and receiving wireless telephone calls. Wireless communications and the cellular protocols used to carry out the communications have become increasingly sophisticated. The rise in sophistication of cellular protocols can be appreciated from the increasing number of cellular protocols used to define performance increases. A greater number of cellular protocols exist today than ever before and many wireless devices are each currently designed to be capable of providing wireless communications over more than one of these cellular protocols. However, wireless devices capable of using a plurality of cellular protocols can face a number of difficulties. For example, a wireless device may be optimized to provide the wireless communication of voices using one cellular protocol. Yet optimization for voice communications using one cellular protocol may render the wireless device less efficient or adept at providing wireless communication of voice over a different cellular protocol.

SUMMARY

According to an embodiment of the disclosure, there is provided a method of controlling a vocoder selection of a wireless device that uses cellular protocols. The method includes wirelessly receiving an instruction at the wireless device from a wireless carrier system, wherein the instruction includes a vocoder identity that is associated with a particular cellular protocol; identifying a vocoder currently in use at the wireless device; and changing the vocoder currently in use at the wireless device if the identified vocoder is different than the vocoder identity included in the instruction.

According to another embodiment of the disclosure, there is provided a method of controlling a vocoder selection of a wireless device that uses cellular protocols. The method includes detecting that the wireless device has begun using a different cellular protocol; determining at the wireless device that a vocoder currently in use is incompatible with the different cellular protocol; selecting a new vocoder that is optimized for use at the wireless device with the different cellular protocol; and beginning use at the wireless device of the newly-selected vocoder.

According to yet another embodiment of the disclosure, there is provided a method of controlling a vocoder selection of a wireless device that uses cellular protocols. The method includes detecting that the wireless device has stopped using voice communications over 4G LTE wideband cellular service through a wireless carrier system; detecting that the wireless device has begun using a cellular protocol for voice communications having a lower bit rate than offered by the 4G LTE wideband cellular service; identifying a vocoder that is optimized for the cellular protocol having a lower bit rate than offered by the 4G LTE wideband cellular service; ending use of the vocoder used with the 4G LTE wideband cellular service; and beginning use of the optimized vocoder.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

The system and method described below controls a vocoder selection of a wireless device based on a cellular protocol used. Wireless devices can communicate using one of any number of different cellular protocols. Wireless carrier systems that provide cellular communications may operate using one or more different cellular protocols. These cellular protocols can generally be understood as including 4G LTE wideband, 4G LTE narrowband, and 3G to name a few. Using these cellular protocols, the wireless device can carry out voice communications using techniques such as Voice over LTE (VoLTE). Depending on which cellular protocol is used by the wireless device, a vocoder can be selected that optimizes the performance of the wireless device sending voice communications using that cellular protocol. For instance, if the wireless device carries out communications using 4G LTE wideband, the wireless device can select a wideband vocoder to use for voice communications over that cellular protocol. However, when the wireless device stops using 4G LTE wideband and begins using a different cellular protocol, such as 3G, the wireless device may not perform optimally using the wideband vocoder. The wireless device can determine that it is no longer using the 4G LTE wideband and has begun using 3G. And when this occurs, the wireless device can determine if the currently-used vocoder is optimized for use with 3G and, if not, identify a new vocoder (in this example optimized for use with 3G) to use and begin using the new vocoder. In some implementations, a wireless carrier system can transmit the identity of the vocoder to be used with the cellular protocol of the wireless carrier system, and the wireless device can select the new vocoder to match the transmitted identity.

Communications System—

Figure 1:
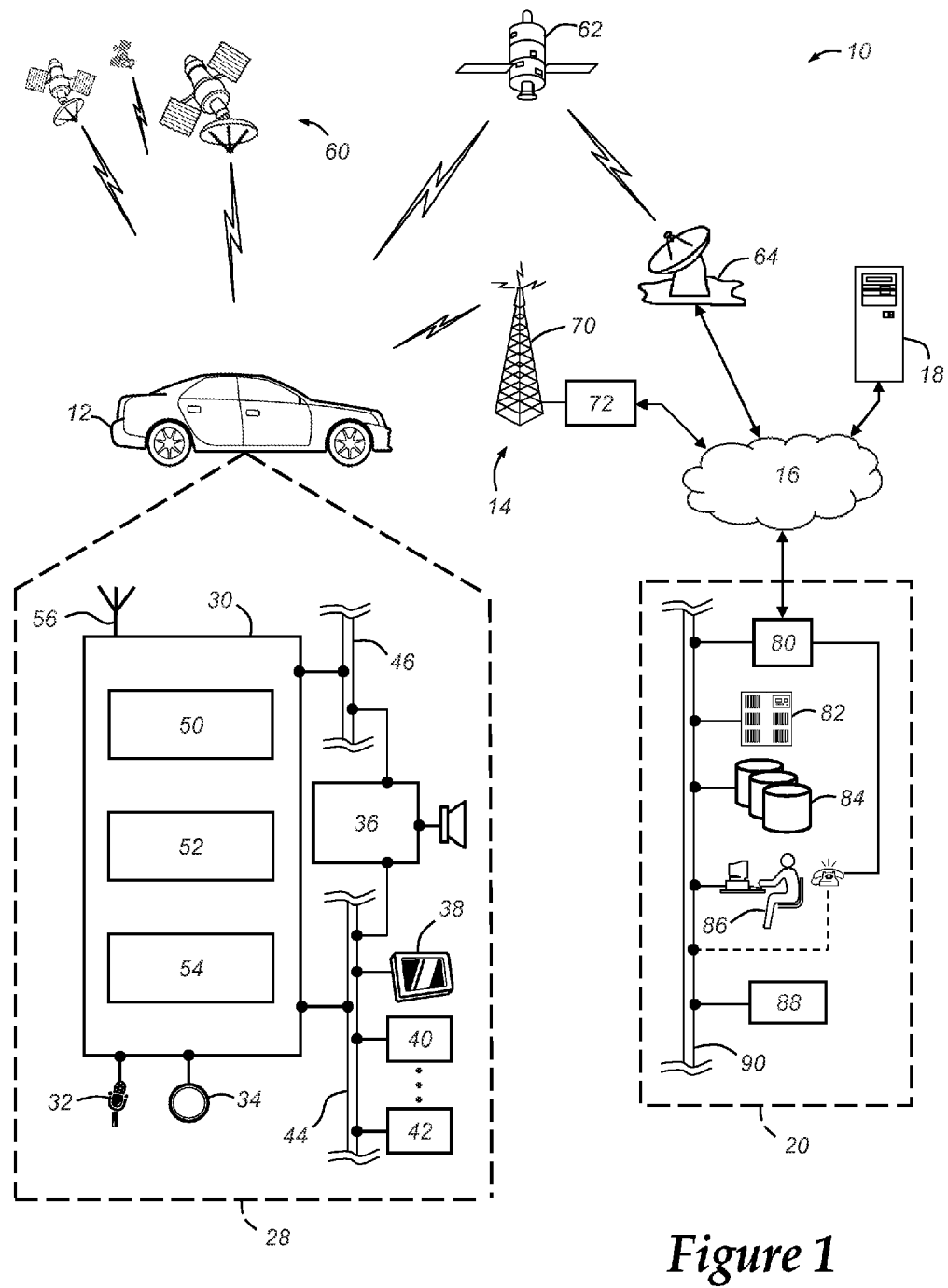
FIG. 1 is a block diagram depicting an embodiment of a communications system that is capable of utilizing the method disclosed herein.

With reference to FIG. 1, there is shown an operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and that enables wireless voice and/or data communication over wireless carrier system 14 and via wireless networking. This enables the vehicle to communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology or cellular protocol. The cellular protocols include for example, analog technologies such as AMPS, or newer digital technologies such as 3G CDMA (e.g., CDMA2000, WCDMA, and HSPA+) or 3G GSM/GPRS. More sophisticated cellular protocols can also be used. For example, a number of "4G" or "4G Long Term Evolution (LTE)" cellular protocols are presently in use. These cellular protocols can be described as the fourth generation of standards for communication by wireless devices, which have been established by the 3rd Generation Partnership Project (3GPP). Generally speaking, the 4G/4G LTE cellular protocols offer greater performance relative to other cellular protocols, such as the 2G or 3G cellular protocols. That is, the 4G/4G LTE can permit a greater signal-to-noise ratio for voice communications and faster upload/download speeds for packet data relative to 2G/3G cellular protocols. Within the 4G or 4G LTE cellular protocols, it is possible to further distinguish between 4G LTE wideband and 4G LTE narrowband. The cellular protocol of the former permits sampling at a higher rate than the latter. For example, the 4G LTE wideband can permit sampling rates of 16 KHz whereas the 4G LTE narrowband may support sampling rates of 8 KHz. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Method—

Figure 2:
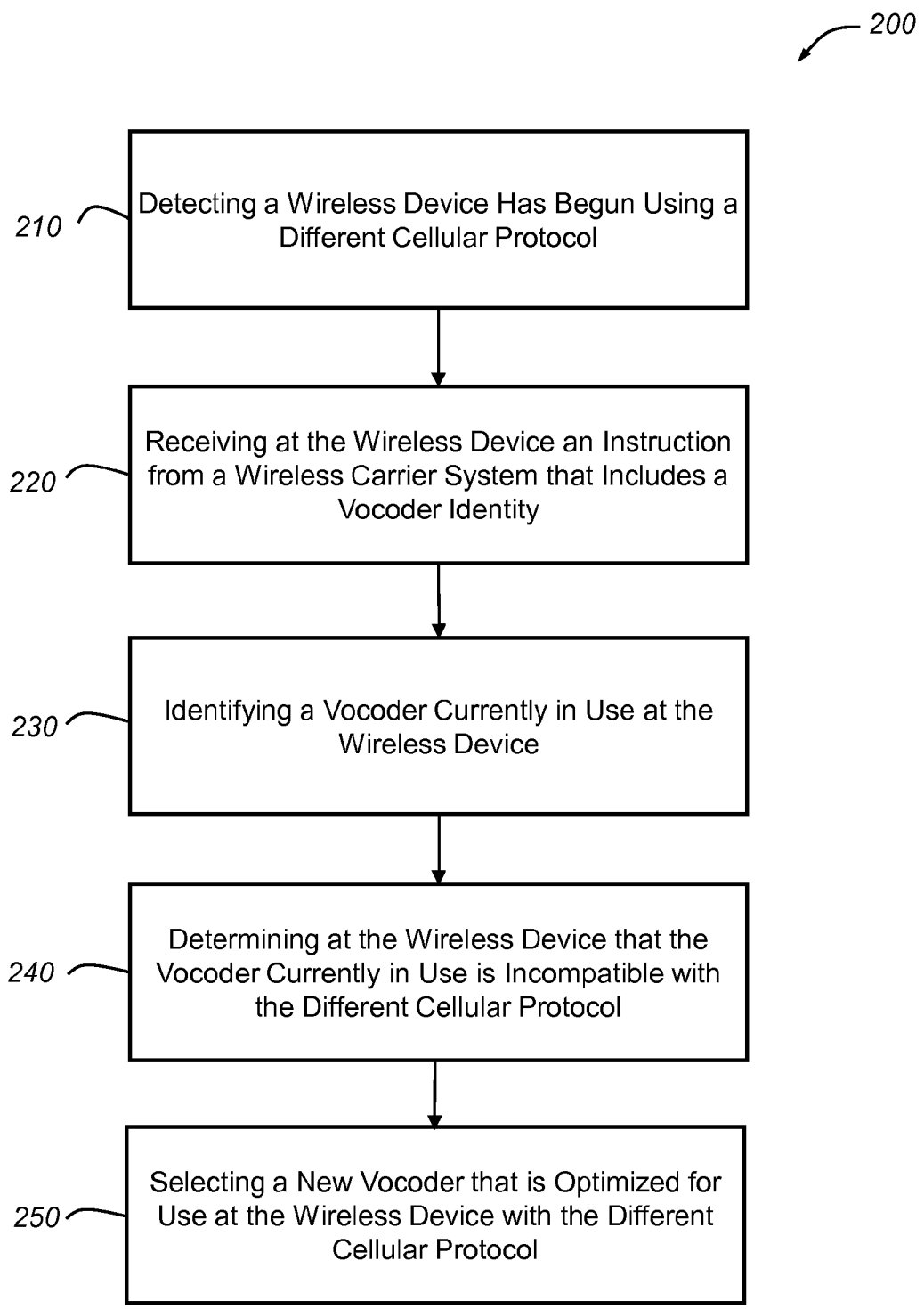
FIG. 2 is a flow chart of a method of controlling a vocoder selection of a wireless device that uses cellular protocols.

Turning now to FIG. 2, there is shown a method 200 of controlling vocoder selection of a wireless device that uses cellular protocols. While other wireless devices can be used with the system and method described herein, the following disclosure is described using the vehicle telematics unit 30 as the wireless device. However, the method 200 described below could also be implemented using other types of wireless devices, such as handheld cellular telephones.

At step 210, the vehicle telematics unit 30 detects it has begun using a different cellular protocol. As the vehicle telematics unit 30 moves from one area to another, the unit 30 may stop communicating with one cell tower, such as cell tower 70, and begin communicating with a different cell tower. Sometimes both cell towers provide cellular service using the same cellular protocol. However, given that the vehicle telematics unit 30 can not only travel great distances but also be located in many different geographical regions and countries, the unit 30 will likely use different cellular protocols provided by different cell towers. Various geographic regions and countries can be serviced by different cellular providers who may use different cellular protocols. Even the cellular protocols within one wireless carrier system 14 can change as the vehicle telematics unit 30 moves from one geographic region to another. Thus, as the vehicle telematics unit 30 is leaving the geographic area within which the unit 30 can carry out wireless communications with one cell tower, the unit 30 can begin establishing cellular communications with a different cell tower.

The different cell tower can provide the vehicle telematics unit 30 a bundle of information that the unit 30 uses to establish cellular communication with the cell tower. Part of this bundle of information can be a cellular protocol identifier. For example, the vehicle telematics unit 30 can currently be using a cell tower 70 that provides cellular service using a 4G wideband cellular protocol. In that sense, the vehicle telematics unit 30 can be "camped on" the cell tower 70 such that a voice call is not currently in progress or the unit 30 can be actively communicating a voice call with the cell tower 70. As the vehicle telematics unit 30 moves away from the cell tower 70, the unit 30 can detect a change from use of one cellular protocol (in this example 4G wideband) to another or different cellular protocol (e.g., 3G cellular service or 4G narrowband) provided by a new or different cell tower. In this example, the vehicle telematics unit 30 can detect that it has stopped using the 4G wideband cellular protocol through the cell tower 70 of the wireless carrier system 14 and begun using a cellular protocol (3G) via a different cell tower having a lower bit rate than offered by the 4G wideband. The lower bit rate can be understood as a lower sampling rate relative to better-performing cellular protocols, which is discussed above with respect to the differences between 4G wideband and 4G narrowband or 3G. It should also be appreciated that the present system and method can accommodate movement from an area using a cellular protocol having a lower bit rate than offered by the 4G wideband (e.g., 3G) to an area that offers a 4G wideband cellular protocol. The method 200 proceeds to step 220.

At step 220, the vehicle telematics unit 30 can wirelessly receive an instruction from the wireless carrier system 14. The bundle of information discussed above can include the instruction, which can identify a vocoder that is optimized for the cellular protocol in use. In one sense, the instruction can include a vocoder identity that is associated with a particular cellular protocol in use locally and can be transmitted to the vehicle telematics unit 30 by the cell tower 70 as part of beginning wireless cellular communications between the cell tower 70 and the unit 30. In one example of this, the vehicle telematics unit 30 can stop using 4G wideband cellular protocol through the wireless carrier system 14 and begin using a cellular protocol (3G) through the wireless carrier system 14 having a lower bit rate than offered by the 4G wideband. As part of this change, the cell tower 70 providing the 3G cellular protocol can wirelessly transmit an instruction to the vehicle telematics unit 30 that includes an identity of a particular vocoder optimized for use with the 3G cellular protocol. In one implementation, this vocoder can be an Adaptive Multi-Rate (AMR) vocoder for use with 3G and other narrowband cellular protocols. The method 200 proceeds to step 230.

At step 230, a vocoder currently in use at the vehicle telematics unit 30 is identified. The vehicle telematics unit 30 can also determine the identity of the vocoder used presently or used with the most-recent cellular protocol. Continuing with the example above, the vehicle telematics unit 30 can determine that it is ending its use of the 4G wideband cellular protocol through the wireless carrier system 14 and begin using a cellular protocol (3G) through the wireless carrier system 14 having a lower bit rate than offered by the 4G wideband. The vehicle telematics unit 30 can then determine the identity of the vocoder it has been using with the 4G wideband cellular protocol. In one implementation, the vocoder used with the 4G wideband cellular protocol can be an AMR wideband or an AMR wideband+ vocoder that may be optimized for use with wideband cellular protocols. The method 200 proceeds to step 240.

At step 240, it is determined at the vehicle telematics unit 30 that the vocoder currently in use is incompatible with the different cellular protocol that the vehicle telematics unit 30 has begun using. After the vocoder currently in use at the vehicle telematics unit 30 has been identified, that identity can be used to determine whether or not the unit 30 will maintain implementation of the vocoder currently in use or begin using a new vocoder. This can be carried out in a number of ways. For example, the vehicle telematics unit 30 can compare the identity of the vocoder included with the instruction in step 220 with the vocoder currently in use. If the comparison results in a match, the vehicle telematics unit 30 can conclude that the optimal vocoder is being used. However, if the comparison does not result in a match, the vehicle telematics unit 30 can decide that it is not using an optimal vocoder and then decide to locate an optimal vocoder. In another example, the vehicle telematics unit 30 can detect a change in cellular protocols when the unit 30 moves from one cell tower 70 to another and/or one wireless carrier system 14 to another. Based on this change in cellular protocols, the vehicle telematics unit 30 can access a list of vocoders that are each associated with one or more cellular protocols. When the vehicle telematics unit 30 identifies the cellular protocol that the unit 30 will begin using, the unit 30 can search the list of vocoders to identify the vocoder that will be used by its associated cellular protocols. Once the vehicle telematics unit 30 has identified the cellular protocol that will be used in the list of vocoders, the unit 30 can then determine whether the vocoder associated with the identified cellular protocol is the same as the vocoder presently used by the unit 30. The list of vocoders can be implemented in a variety of ways and stored in different locations. For example, the list of vocoders could be stored at the vehicle 12 in digital memory devices 54. However, it is also possible to maintain the list of vocoders and corresponding cellular protocols remotely, such as at the computer 18 or call center 20, thereby permitting the vehicle telematics unit 30 access to the list via the wireless carrier system 14. The method 200 proceeds to step 250.

At step 250, a new vocoder is selected, which is optimized for use at the vehicle telematics unit 30 with the different or new cellular protocol if the vocoder currently used is incompatible with the different/new cellular protocol. When the steps above indicate that the vehicle telematics unit 30 should begin using a new or different vocoder that is optimized for use with the cellular protocol the unit 30 will begin using, the unit 30 can access the new vocoder stored at the vehicle 12 or vehicle telematics unit 30 and begin carrying out voice communications using the new vocoder. In one example, when the vehicle telematics unit 30 has been using a vocoder that is optimized for a cellular protocol having a lower bit rate than offered by the cellular protocol the unit 30 will begin using, the unit can decide to stop using the low-bit rate vocoder (e.g., the AMR vocoder) and begin using an AMR wideband or an AMR wideband+ vocoder. The method 200 then ends.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of controlling a vocoder selection of a wireless device that uses cellular protocols, comprising the steps of:
   (a) detecting that the wireless device has stopped using voice communications over 4G LTE wideband cellular service through a wireless carrier system;
   (b) detecting that the wireless device has begun using a cellular protocol for voice communications having a lower bit rate than offered by the 4G LTE wideband cellular service;
   (c) receiving an instruction from the wireless carrier system at the wireless device identifying a vocoder used with the cellular protocol for voice communications having a lower bit rate than offered by the 4G LTE wideband cellular service;
   (d) comparing the vocoder identified in the instruction with the vocoder presently used at the wireless device;
   (e) identifying a vocoder that is optimized for the cellular protocol having a lower bit rate than offered by the 4G LTE wideband cellular service at the wireless device when the vocoder identified in the instruction does not match the vocoder presently used at the wireless device;
   (f) ending use of the vocoder used with the 4G LTE wideband cellular service; and
   (g) beginning use of the vocoder identified in step (c).

2. The method of claim 1, wherein the voice communications are provided using Voice over Long-Term Evolution (VoLTE).

3. The method of claim 1, wherein the wireless device detects its stoppage of 4G LTE wideband cellular service based on an instruction received from a wireless carrier system or a cell tower.

4. The method of claim 1, further comprising the steps of searching for the cellular protocol having a lower bit rate than offered by the 4G LTE wideband cellular service in a list of vocoders; identifying the cellular protocol in the list; and determining the vocoder associated with the cellular protocol.

5. The method of claim 4, wherein the list of vocoders is stored at a vehicle.

6. The method of claim 4, wherein the list of vocoders is stored at a central facility.

\* \* \* \* \*